United States Patent [19]

Demarest, Jr.

[11] Patent Number: 4,599,100
[45] Date of Patent: Jul. 8, 1986

[54] MELTING GLASS WITH PORT AND MELTER BURNERS FOR $NO_x$ CONTROL

[75] Inventor: Henry M. Demarest, Jr., Natrona Heights, Pa.

[73] Assignee: PPG Industries, Inc., Pittsburgh, Pa.

[21] Appl. No.: 718,622

[22] Filed: Apr. 1, 1985

[51] Int. Cl.⁴ .................... C03B 5/16; C03B 5/44
[52] U.S. Cl. ........................... 65/134; 65/135; 65/136; 65/337; 65/346
[58] Field of Search ............. 65/134, 135, 136, 337, 65/346

[56] References Cited

U.S. PATENT DOCUMENTS

| | | | |
|---|---|---|---|
| 1,059,584 | 4/1913 | Winand | 422/170 |
| 1,582,132 | 4/1926 | Delaguvellerie | 65/337 X |
| 2,126,272 | 5/1937 | Morton | 263/15 |
| 2,539,694 | 2/1948 | McIntyre | 263/11 |
| 3,353,941 | 11/1967 | Hanks et al. | 65/32 |
| 3,837,832 | 9/1974 | Pecoraro et al. | 65/136 X |
| 3,856,496 | 12/1974 | Nesbitt et al. | 65/29 |
| 3,867,507 | 2/1975 | Myerson | 423/212 |
| 3,873,671 | 4/1975 | Reed et al. | 423/235 |
| 3,890,084 | 6/1975 | Voorheis et al. | 431/10 |
| 3,900,554 | 8/1975 | Lyon | 423/235 |
| 3,907,488 | 9/1975 | Takahaski et al. | 431/2 |
| 4,328,020 | 5/1982 | Hughes | 65/27 |
| 4,347,072 | 8/1982 | Nagaoka et al. | 65/135 |
| 4,372,770 | 2/1983 | Krumwiede et al. | 65/27 |
| 4,391,581 | 7/1983 | Daman et al. | 431/160 |

Primary Examiner—Arthur Kellogg
Attorney, Agent, or Firm—Robert A. Westerlund, Jr.

[57] ABSTRACT

When primary fuel for combustion is combined with an amount of oxygen in excess of the stoichiometric amount required for complete combustion, in the ports of a glassmaking furnace, additional fuel is injected into the melting chamber to consume at least a portion of the excess oxygen and reduce at least a portion of $NO_x$ present in the melting chamber, to thereby reduce or suppress $NO_x$ emissions from the furnace.

10 Claims, 7 Drawing Figures

MELTING GLASS WITH PORT AND MELTER BURNERS FOR NO$_x$ CONTROL

FIELD OF THE INVENTION

The present invention relates to a method for reducing the amount of NO$_x$ emissions from a glass melting furnace.

BACKGROUND OF THE INVENTION

Melting of glass entails the combustion of large amounts of fuel in a melting furnace in order to provide the required melting temperatures by direct heating. The fuel (usually natural gas and sometimes fuel oil) is usually mixed with an excess of air beyond that theoretically required for complete combustion in order to assure that complete combustion actually occurs within the furnace for the sake of thermal efficiency, and particularly in the case of flat glass melting operations, to assure that oxidizing conditions are maintained within the furnace. This combination of conditions within a glass furnace is conducive to the oxidation of nitrogen in the combustion air to NO$_x$.

NO$_x$ is a shorthand designation for oxides of nitrogen, such as NO and NO$_2$. In the high temperature conditions of a glass melting furnace, the oxide and nitrogen formed is almost entirely NO, but after exhaust containing NO is released to the atmosphere, much of the NO is converted to NO$_2$. NO$_2$ is considered an objectionable air pollutant; it is also believed to be involved in the chemistry of smog formation. Therefore, large volume combustion sources such as glass melting furnaces are susceptible to governmental regulation that may severely restrict their operation.

Many proposals have been made for controlling NO$_x$ emissions from boilers, internal combustion engines, and the like, but most are incompatible with process furnaces as employed for melting glass. Many of the previous proposals involve catalytic destruction of NO$_x$, but catalytic treatment of glass furnace emissions has been found to be unsatisfactory because the required catalyst contact devices quickly become plugged and corroded due to the particulate content and corrosiveness of glass furnace exhaust. Other proposals involve modifying combustion conditions, but substantial modifications in a glass melting furnace are restricted by the requirements of the melting process. Some NO$_x$ control proposals involve treating the exhaust gas within narrow temperature ranges, but in a glass furnace employing regenerators, wherein the firing is reversed periodically, the exhaust gas temperatures are continually changing. Yet another category of prior art NO$_x$ removal processes entails chemically reacting the NO$_x$ at reduced temperature, usually in a liquid phase. Such techniques appear to be prohibitively costly for application to glass furnace emissions due to the large cooling capacity and chemical consumption requirements and liquid waste disposal problems.

Non-catalytic processes for reducing NO$_x$ emissions generally involve injecting ammonia into an exhaust gas stream to selectively reduce NO to nitrogen and water, e.g. such as disclosed in U.S. Pat. No. 3,900,554. The major drawback with this approach is that the process is effective in only a narrow temperature range. U.S. Pat. No. 4,328,020 issued to Hughes, teaches that suitable conditions for ammonia reduction of NO$_x$ exist, or can be created, for a substantial portion of each firing cycle in a flue connecting primary and secondary regenerator chambers. Ammonia injection is discontinued whenever the temperature of the exhaust gas passing through the flue falls outside of the range of 870° C. to 1090° C. (700° C. to 1090° C. if the ammonia is injected in combination with a suitable amount of hydrogen). In another embodiment disclosed in the aforesaid patent, ammonia is sequentially injected into two or more zones of the regenerator as the temperature in each zone passes through the effective NO$_x$ reduction range. Although the methods taught by the Hughes patent are capable of removing a large portion of the NO$_x$ from glass furnace exhausts, the overall effectiveness of the ammonia reduction technique is reduced by the ineffectiveness of this technique during substantial portions of each firing cycle when the exhaust gas temperatures are unsuitable, i.e. outside of the above-delineated effective ammonia reduction temperature range.

A further non-catalytic chemical reduction of NO$_x$ technique is taught in U.S. Pat. No. 3,867,507 issued to Myerson. The Myerson patent teaches the chemical reduction of NO$_x$ in a combustion effluent stream by hydrocarbons and oxygen at elevated temperatures. This technique suffers the same disadvantages as those previously assigned to the Hughes patent ammonia injection technique, with the further disadvantage of the increased costs and operation difficulties of the additional oxidizing step. These non-catalytic processes also all have the additional disadvantage of being difficult to control.

Another presently available technique for reducing NO$_x$ contaminants in furnace exhaust products is taught in U.S. Pat. No. 3,890,084 issued to Voorhies et al. The Voorhies et al. patent teaches firing a lower bank of burners of a boiler with insufficient air (i.e. rich) and an upper burner bank with additional air (i.e. lean) to compensate for the air deficiency of the lower burner bank. The additional air from the upper burner bank is intermixed with the uncombusted fuel from the lower burners and such fuel is burned at a later stage downstream of the burners. This results in incomplete combustion and a reducing atmosphere (i.e. excess fuel) which is later oxidized to complete the combustion, which procedure is unacceptable for melting glass. The Voorhies et al. method is not suitable for use in a glass melting furnace, because in a glass melting furnace an oxidizing atmosphere must always be present to ensure proper glass quality. If excess fuel is present at the surface of the melting glass, a condition known as a reducing atmosphere, the excess fuel will discolor and produce brownish streaks in the glass.

U.S. Pat. No. 4,372,770 issued to Krumwiede et al. teaches a method of melting glass with a two-stage NO$_x$ control. The Krumwiede et al. patent teaches afterburning in conjunction with ammonia injection to achieve high levels of NO$_x$ reduction in glass melting furnaces. During portions of each firing cycle when thermal conditions render ammonia injection ineffective, fuel is injected into selected portions of the exhaust passages to suppress NO$_x$ formation. A limitation of this technique is that the heat generated by afterburning is not available to assist in the melting of the glass in the furnace melting chamber.

It would be desirable to have a method and apparatus for reducing furnace NO$_x$ emission levels which eliminates the disadvantages and shortcomings of existing techniques.

SUMMARY OF THE INVENTION

Primary fuel for combustion is introduced through burners mounted about the firing ports of a glass melting furnace into an amount of air passing through the ports in excess of the stoichiometric amount required for complete combustion, in the normal manner, to provide an oxidizing (i.e. $O_2$ rich) atmosphere across the surface of the melting glass. It is believed that the bulk of $NO_x$ emissions resulting from combustion in a glass melting furnace is already formed before it reaches the exhaust ports leading to the furnace regenerators, and that afterburning is relatively ineffective for reducing $NO_x$ that has already been formed. Therefore, in accordance with the present invention, additional or secondary fuel is injected via additional burner(s) through the roof of the furnace melting chamber to consume excess oxygen in the upper portion of the chamber as well as reducing $NO_x$ pollutants before the combustion exhaust products reach the exhaust ports. The parameters of the additional fuel injection are selected to minimize contamination of the melting glass by maintaining an oxidizing atmosphere across the glass surface while maintaining $NO_x$ emissions in the combustion effluent at least below a predetermined maximum level. Accordingly, the additional fuel should be injected into the melting chamber at a flow rate and volume sufficient to provide an $O_2$ rich region above the glass and a fuel rich region thereabove, and to further provide relatively low overall excess air and at least substantially complete combustion by the time the combustion gases exit the melting chamber.

In addition to consuming excess oxygen and reducing the $NO_x$ in the melting chamber to nitrogen, the additional fuel delivered by the melter roof burners provides additional heat which radiates to the surface of the melting glass to assist in the melting of the glass. Moreover, radiant heat released in the melting chamber to the glass is increased, thereby decreasing the temperature of the gases in the regenerators, relative to $NO_x$ reduction systems which "afterburn" the exhaust gases as they pass through the exhaust ports or the regenerators, thereby minimizing damage to the regenerators attributable to excessively hot exhaust gases. Further, the present invention provides for minimization of $NO_x$ emissions without the necessity of reducing the amount of excess air employed for combustion, or otherwise altering the port burners firing arrangement.

DESCRIPTION OF THE INVENTION

The invention will be described in conjunction with a typical crossfired, regenerative glassmaking furnace, which is believed to be the environment in which the invention will find its greatest utility. However, as will be appreciated by those of ordinary skill in the art, the principles of the present invention may be applied to any type of glass melting furnace in which the same or similar conditions are encountered.

Figure 1:
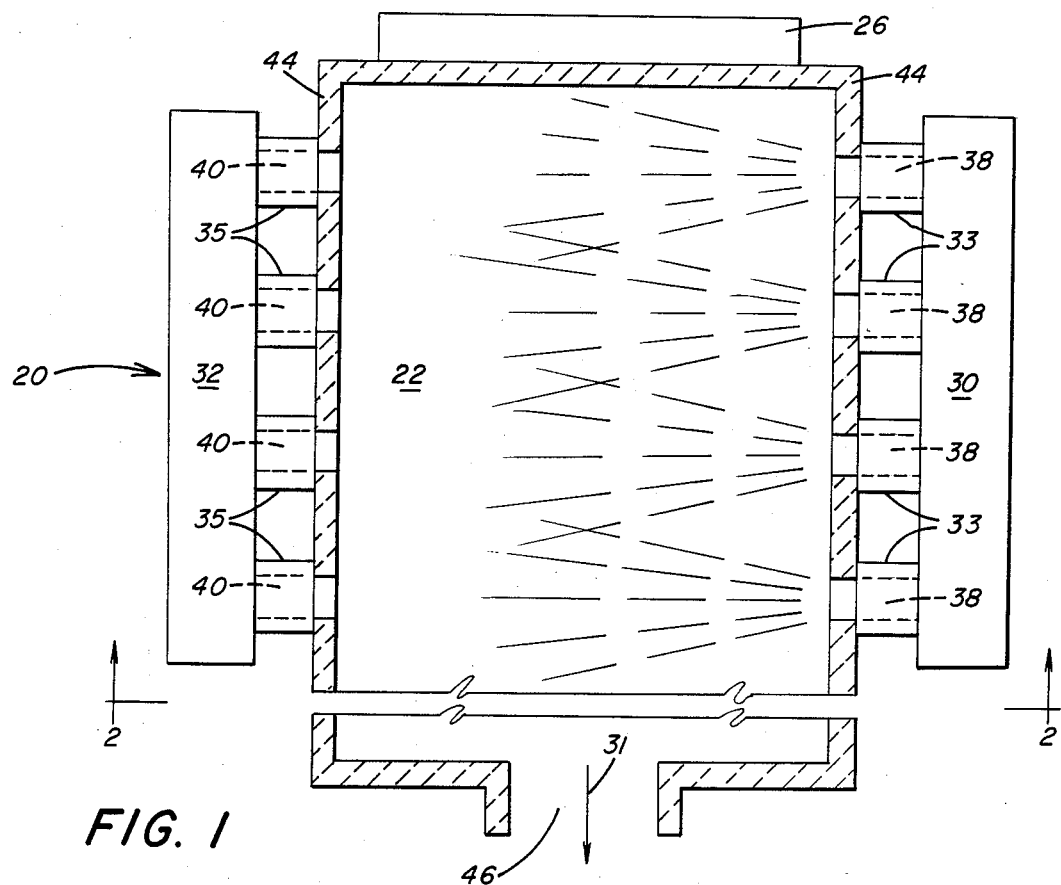
FIG. 1 is a plan view of a crossfired regenerative furnace showing left side ports during their firing cycle and right side ports during their exhaust or off-firing cycle.
Figure 2:
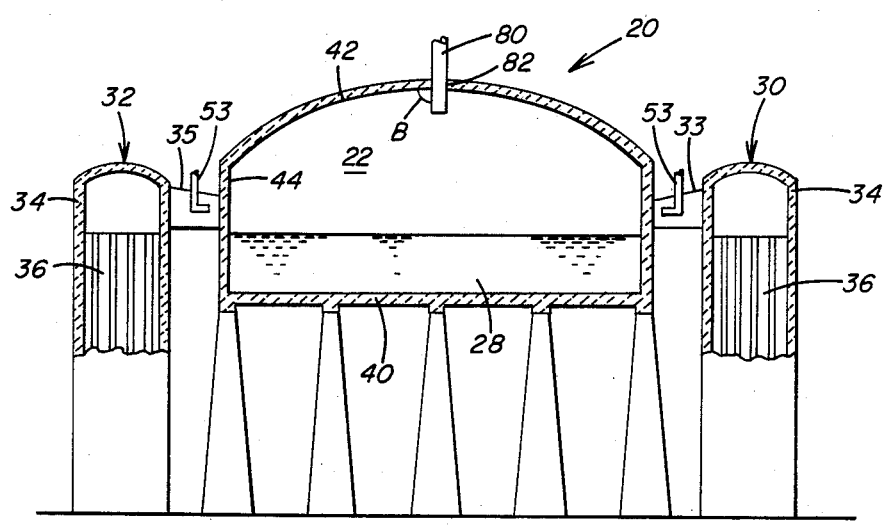
FIG. 2 is a lateral cross-sectional view of the furnace shown in FIG. 1, with portions removed for purposes of illustrative clarity, and embodying features of this invention.

In FIGS. 1 and 2 there is depicted a typical flat glass melting furnace 20 having a melting chamber 22 flanked by a pair of regenerators 30 and 32 of like construction. Each regenerator 30, 32 includes a refractory housing 34 containing a bed of refractory packing 36 which comprises a checker structure of refractory brick permitting the alternate passage of air and exhaust gas therethrough. Each of the regenerators 30, 32 communicates with the melting chamber 22 by means of a plurality of ports 38, 40 spaced along the opposite sides of the melter 22. The melting chamber 22 has a refractory bottom 40, a refractory crown or roof 42, refractory sidewalls 44, refractory exit area 46, and a refractory back wall 48. Raw glass-making ingredients are fed from a hopper (not shown) into an inlet extension 26 (also known as a "doghouse") of the furnace 20. The glass batch material is then pushed by a batch feeder (not shown) into the melting chamber 22, where it floats upon a pool of molten glass 28 and moves thereacross in the direction of the arrow 31 until it has melted and become a part of the molten glass 28. Quantities of molten glass are removed from the melting chamber 22 at the exit area 46 to maintain the pool of molten glass 28 at a generally constant depth.

The interior of the melting chamber 22 is heated by the combustion of fuels mixed with sufficient quantities of air. Fuels which may be used in the practice of the invention include gaseous fuels, atomized liquid fuels, and mixtures of powdered fuels and air. In the crossfired regenerative furnace 20 of FIGS. 1 and 2, during the first half of the combustion cycle, air passes from the regenerator 30 through port necks 33 and ports 38 into the melting chamber 22, while combustion products are exhausted through the ports 40 and port necks 35 into the regenerator 32, where heat is extracted from the combustion products by the refractory packing 36 located therewithin. During the second half of the combustion cycle, the process is reversed, with air passing from the regenerator 32 through the port necks 35 and ports 40 into the melting chamber 22, and with the combustion products exhausted through the ports 38 and the port necks 33 into the regenerator 30, where heat is extracted from the combustion products by the refractory packing 36 located therewithin. The air is preheated to a substantial degree as it passes through a heated regenerator 30 or 32 into the melting chamber 22, thus improving furnace energy efficiency. Flows (i.e. direction of combustion) are periodically (e.g. every 10 minutes) reversed in the above manner. Hereinafter, ports which are passing air into the melting chamber 22 are in their "firing cycle" and ports passing combustion products are in their "off-firing" or "exhaust cycle", e.g., in FIG. 1, the ports 38 are in their firing cycle and the ports 40 are in their exhaust cycle.

Figure 3:
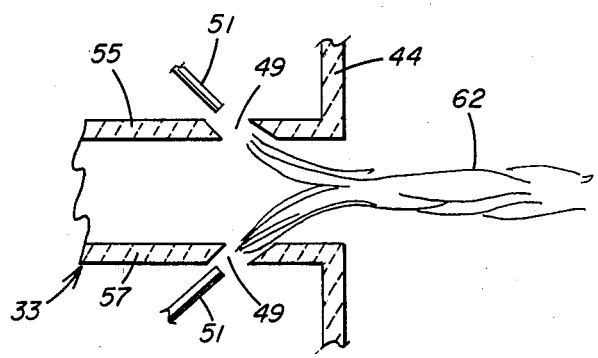
FIG. 3 is a diagrammatic, fragmentary plan view of a cross-fired regenerative furnace, showing a typical port burners firing arrangement.

The fuel for combustion can be supplied by any convenient fuel supply means. Referring to FIG. 3, there is depicted a typical fuel supply or firing arrangement, wherein burners 51 project fuel through suitable openings 49 which are provided through the opposite side walls 55 and 57 of each port neck 33 and 35 adjacent to the ports 38 and 40, respectively. The burners 51 discharge, during the firing cycle of their associated ports 38 or 40, combustible gases, e.g. natural gas or fuel oil, into the incoming stream of preheated combustion air passing through their associated port necks 33 or 35, respectively. The gases supplied by the burners 51 ignite in the presence of the heated air and the resultant main or primary flame 62 and the ensuing products of combustion issue through the ports 38 or 40 into the melting chamber 22 and across the surface 23 of the melting glass 28 flowing therethrough. If the burners 51 are extended through the openings 49, then a fluid coolant jacket should be mounted around at least the portion of the burner which extends into the interior of the port neck 33 or 35, to thereby protect the burners from the high temperature, corrosive atmosphere about the ports 38 or 40. However, it should be clearly understood that the type of burners and the burners arrangement employed in the practice of this invention is not limiting thereto. For example, another suitable port burners construction and port burners firing arrangement is of the type taught in U.S. Pat. No. 4,391,581 issued to Daman et al., which teachings are herein incorporated by reference. The Daman et al. patent teaches burners having an angled tip portion, with the burners being preferably supported by an adjustable mounting bracket (not shown).

The amount of preheated, combustion air passing through the port necks 33 and 35, and their respective ports 38 and 40, is preferably in excess of the stoichiometric amount required to effect complete combustion of the fuel supplied by the port burners 53. This practice is sometimes referred to as "excess air firing". Excess air firing is practiced to ensure that an oxidizing atmosphere is maintained in the melting chamber 22, as a reducing atmosphere may cause discoloration, e.g. brownish streaks and/or other defects in the finished glass product. However, excess oxygen (i.e. unconsumed oxygen) is present in the melting chamber 22 when excess air firing is employed. At the elevated temperatures within the melting chamber 22, this excess oxygen rapidly combines with nitrogen in the chamber atmosphere to form oxides of nitrogen, commonly referred to by the shorthand designation $NO_x$. $NO_x$ emissions from the furnace into the outside atmosphere react with CO (carbon monoxide) and other pollutants in the presence of sunlight to create "smog." Therefore, due to environmental concerns and regulatory constraints, it is desirable to reduce or minimize the level of furnace $NO_x$ emissions. However, it is also desirable to maintain a threshold level of excess air firing in order to ensure oxidizing conditions to maximize glass quality. The present invention provides for minimization of $NO_x$ emissions without the necessity of reducing the amount of excess air employed for combustion, or otherwise altering the port burners firing arrangement. Further, the present invention does not entail post —$NO_x$ formation treatment of the exhaust gases.

Figure 4:
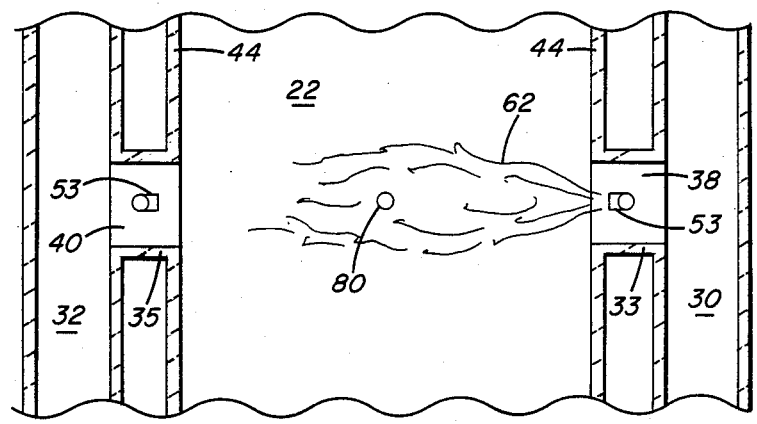
FIG. 4 is a fragmentary, cross-sectional plan view of the furnace of FIG. 2.

Referring now to FIGS. 2 and 4, there is shown a preferred embodiment of $NO_x$ reduction in accordance with this invention. More particularly, at least one additional burner 80 is mounted through or near at least one suitable opening 82 provided through a center portion of the roof 42 of the melter 22, preferably between at least one pair of opposed ports 38, 40, e.g. at the midpoint of the roof 42 between the opposed ports 38, 40. However, the burner(s) 80 may be located anywhere through or near the melter roof 42 which facilitates injection of fuel through the opening(s) 82 into the melting chamber 22 to combine with excess oxygen present therewithin (due to excess air firing) to consume at least a portion of the excess oxygen, and to reduce $NO_x$ pollutants. The burner(s) 80 can suitably be of either the straight pipe or angled tip type, and may be adjustable to vary the angle of fuel injection.

In the embodiment shown in FIG. 2, the burner 80 extends substantially vertically downwardly through the opening 82 into the interior of the melting chamber 22. The burner 80 forms an approximately 90° angle B with the crown of the melter roof 42. However, the angle B is not limiting to the invention and may suitably be any angle which enables the objectives of the invention to be met. The burner 80 is connected to a fuel supply source (not shown). The amount of excess air being used for firing, as well as other furnace operating parameters, are used to establish the parameters for additional fuel injection to achieve a desired level of $NO_x$ reduction. The fuel injection parameters should be selected to maintain at least a minimum oxidizing atmosphere across the surface 23 of the melting glass 28 to prevent damage to the glass 28 while also consuming enough excess oxygen and reducing enough $NO_x$ in the melting chamber 22 to keep furnace $NO_x$ emissions below a preselected level. Accordingly, the additional fuel should be injected into the melting chamber 22 at a flow rate and volume sufficient to provide an $O_2$ rich region above the glass and a fuel rich region above the $O_2$ rich region, and to provide relatively low overall excess air and at least substantially complete combustion by the time the combustion gases exit the melting chamber 22 (i.e. before reaching the port 38 or 40 in its off-firing or exhaust cycle). More particularly, for example, the stoichiometric amount of fuel required to effect complete combustion of this excess oxygen, or preferably somewhat less than this amount, is injected into the melting chamber 22.

Figure 5:
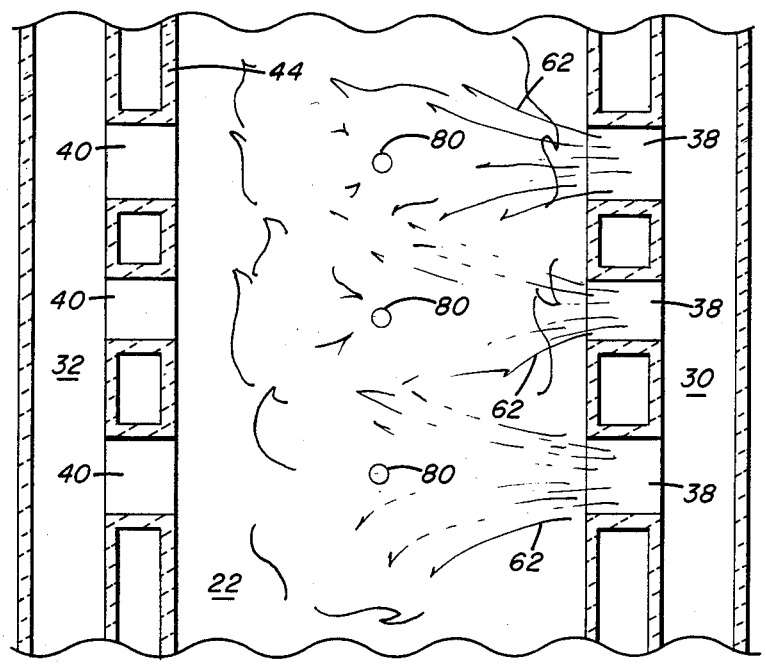
FIG. 5 is a fragmentary cross-sectional plan view of a cross-fired regenerative furnace, showing the location of a plurality of additional melter burners which may be employed to practice this invention.

Referring now to FIG. 5, there can be seen a plurality of melter burners 80 mounted through a center portion of the melter roof 42 between a corresponding number of pairs of opposed ports 38, 40. The discussion regarding the establishment of melter burner fuel injection parameters with respect to the originally discussed burner 80 is applicable to each burner 80 provided in addition thereto. Therefore, each burner 80 is preferably independently controllable to provide varying fuel input parameters for each burner 80 in response to varying amounts of excess air which may be employed for each separate pair of associated ports 38, 40.

Figure 6:
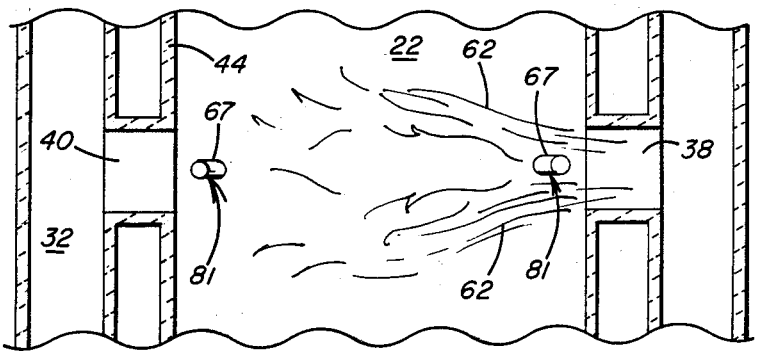
FIG. 6 is a lateral cross-sectional view of the furnace of FIG. 1, with portions removed for clarity, and embodying features of an alternative embodiment of this invention.
Figure 7:
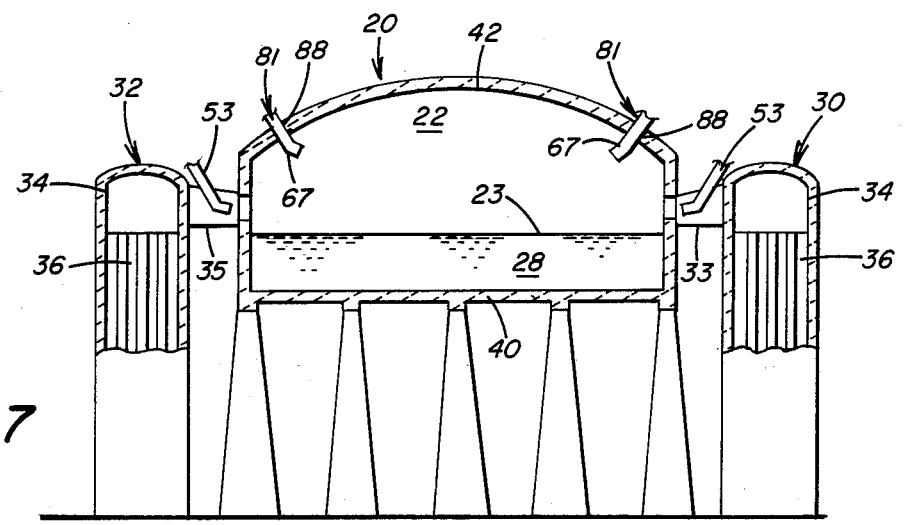
FIG. 7 is a fragmentary cross-sectional plan view of the crossfired regenerative furnace of FIG. 6.

The melter burners can be located at various locations along the arcuate melter roof 42 other than at a center portion of the roof 42. For example, referring to FIGS. 6 and 7, a pair of burners 81 are mounted through suitable openings 88 provided through opposite off-center portions of the melter roof 42. Although the location of the melter burners 81 is not limiting to the invention, it is preferred that the burners 81 be located in an area extending from a point ¾ of the arcuate distance from the center to one side edge of the roof 42 to a point ¾ of the arcuate distance from the center to the opposite side edge of the roof 42, in order to minimize the effect of the additional fuel injection on the primary flame 62 geometry and further, to minimize disruption of the oxidizing layer over the glass surface 23 by ensuring that a fuel-rich region is maintained above the oxygen-rich region located over the glass surface 23. The burner(s) 81 can suitably be of the type having an angled tip portion 67 and/or a fluid coolant jacket (not shown). Further, the burner(s) 81 may be supported by an omni-planarly adjustable mounting bracket (not shown) (e.g. of the type taught in Daman et al.) to facilitate vertical, horizontal, and/or lateral angular adjustments of the position of the supported melter burner(s) 81 in response to varying furnace operating parameters, such as the level of excess air firing and/or the geometry of the primary flame 62 issuing from the port pair associated with the supported burner(s) 81. The fuel injection parameters should be selected such that the fuel is injected into the melting chamber 22 at an angle of injection and at a volumetric flow rate which ensures that a sufficient oxidizing layer is maintained across the surface 23 of the melting glass 28 and which further ensures that enough excess oxygen is consumed and enough $NO_x$ reduced to keep $NO_x$ emissions below a predetermined maximum level. It is important that the fuel be injected in such a manner as to prevent disruption of the oxidizing atmosphere above the glass surface 23, which may cause defects in the glass, as previously discussed.

It should be clearly understood that the number and type of burners employed, the configuration in which they are employed, the type of fuel used, and other specifics hereinabove described, are not limiting to the present invention, but rather are merely illustrative of the basic concepts herein taught. It should also be understood that other modifications and/or variations as will appear to those skilled in the art may be resorted to without departing from the spirit and scope of the invention, which should be interpreted solely on the basis of the following claims.

What is claimed is:

1. A method for reducing $NO_x$ emissions from a glassmaking furnace in which fuel is mixed with an amount of oxygen in excess of the stoichiometric amount required to effect complete combustion of the fuel to issue an $O_2$ rich primary flame into the melting chamber of the furnace to melt a glass charge held in the melting chamber and further, to provide a protective $O_2$ rich region above the molten glass charge, comprising the step of injecting additional fuel into the melting chamber at a location above the primary flame in such a manner as to provide a fuel rich region above said $O_2$ rich region and low overall excess oxygen in the melting chamber, said additional fuel being injected at a flow rate and in a volume sufficient to consume at least a portion of said excess oxygen and reduce the amount of $NO_x$ present in the melting chamber, to thereby reduce $NO_x$ emissions.

2. The method as set forth in claim 1, wherein said additional fuel is injected in an amount substantially equal to the stoichiometric amount required to effect complete combustion of the excess oxygen.

3. The method as set forth in claim 1, wherein said additional fuel is injected in an amount less than the stoichiometric amount required to effect complete combustion of the excess oxygen.

4. The method as set forth in claim 1, wherein said additional fuel is injected at two or more locations above the primary flame.

5. The method as set forth in claim 1, wherein said additional fuel is injected through the roof of the melting chamber.

6. The method as set forth in claim 1, wherein the glassmaking furnace is a crossfired, regenerative furnace having a plurality of ports spaced along opposite sides of the melting chamber and arranged in opposed, cooperative pairs.

7. The method as set forth in claim 6, wherein said additional fuel is injected through a center portion of the roof of the melting chamber at one or more locations between one or more pairs of opposed ports.

8. The method as set forth in claim 6, wherein said additional fuel is injected through the roof of the melting chamber at one or more locations between one or more pairs of opposed ports, in a zone extending between a point about $\frac{3}{4}$ of the arcuate distance between the center and one side edge of the roof to a point about $\frac{3}{4}$ of the arcuate distance between the center and the opposite side edge of the roof.

9. The method as set forth in claim 8, wherein said additional fuel is injected through at least one burner having an angled tip portion.

10. The method as set forth in claim 8, wherein said additional fuel is injected through at least one burner which is angularly adjustable.

* * * * *